United States Patent [11] 3,617,710

[72] Inventors Thomas E. Honeycutt;
John J. Ehrlich, both of Huntsville, Ala.

[21] Appl. No. 877,342
[22] Filed Nov. 17, 1969
[45] Patented Nov. 2, 1971
[73] Assignee The United States of America as represented by the Secretary of the Army

[54] MULTIPLEX DIGITAL LASER GENERATOR
7 Claims, 6 Drawing Figs.

[52] U.S. Cl. .......... 250/199
[51] Int. Cl. .......... H04b 9/00
[50] Field of Search .......... 250/199; 332/7.51

[56] References Cited
UNITED STATES PATENTS

| | | | |
|---|---|---|---|
| 1,981,999 | 11/1934 | French | 250/199 |
| 2,651,715 | 9/1953 | Hines | 250/199 |
| 3,430,048 | 2/1969 | Rubinstein | 332/7.51 |
| 3,464,024 | 8/1969 | Bell et al. | 331/94.5 |

*Primary Examiner*—Robert L. Griffin
*Assistant Examiner*—Donald E. Stout
*Attorneys*—Harry M. Saragovitz, Edward J. Kelly, Herbert Berl and William P. Murphy

ABSTRACT: A laser generator for producing a single laser beam carrying several channels of digital information simultaneously is disclosed. The frequency components of the laser emission are spatially separated inside the generator cavity, and each component is separately pulse-code modulated according to a digital input signal. A simple receiver is also disclosed.

Thomas E. Honeycutt
John J. Ehrlich,
INVENTORS
Harry M. Saragovitz
BY Edward J. Kelly
Herbert Berl
William P. Murphy Thomas E. Honeycutt
John J. Ehrlich,
INVENTORS
BY Harry M. Saragovitz
Edward J. Kelly
Herbert Berl
William P. Murphy

MULTIPLEX DIGITAL LASER GENERATOR

BACKGROUND OF THE INVENTION

The invention relates generally to digital laser communications, and in particular to generators and modulators therefor.

Laser communication systems are generally broken down into a generator to produce the carrier wave, a modulator to impress information on the carrier according to an input signal, a transmission medium, a receiver, and a demodulator. In digital systems, use is made of pulse-code modulation, or PCM, in which one bit of digital information in the input signal is represented by the carrier being in one of two different states at a particular time. The efficiency of the system depends on how much information the laser beam can be made to carry in a time period, how much of the energy of the carrier is wasted in effecting the modulation, and how well the difference between the two carrier states is preserved in transmission.

SUMMARY OF THE INVENTION

The invention is a laser generator utilizing light dispersing elements located inside the generator's optical cavity to spatially separate the frequency components of the narrow frequency band light emitted from the lasing medium so that chosen components may be separately pulse-code modulated. The invention makes possible the efficient generation of a single laser beam carrying several channels of digital information simultaneously, that is, a multiplexed laser beam. Thus this invention can transmit digital information at N times the presently available rate, where N is the number of frequency components utilized. This number will be limited only by the number of dominant frequency components produced in the laser system being used, and by the fact that the transmission power is split among the components utilized.

The invention compensates for the latter factor by making possible, as the preferred embodiment will illustrate, the use of a pulse-code modulation scheme which does not waste carrier energy in effecting the modulation, so that the percentage of the generator power that is present in the modulated carrier wave is much higher than is possible with other generators. This scheme has the further inherent advantage of representing a bit of digital information by the presence or absence of the respective frequency component in the laser beam, thus reducing the problem of interference by the transmission medium with the two carrier states.

For further explanation of the invention, the following drawings and description disclose embodiments of the invention.

DESCRIPTION OF THE PREFERRED EMBODIMENT

Figure 1:
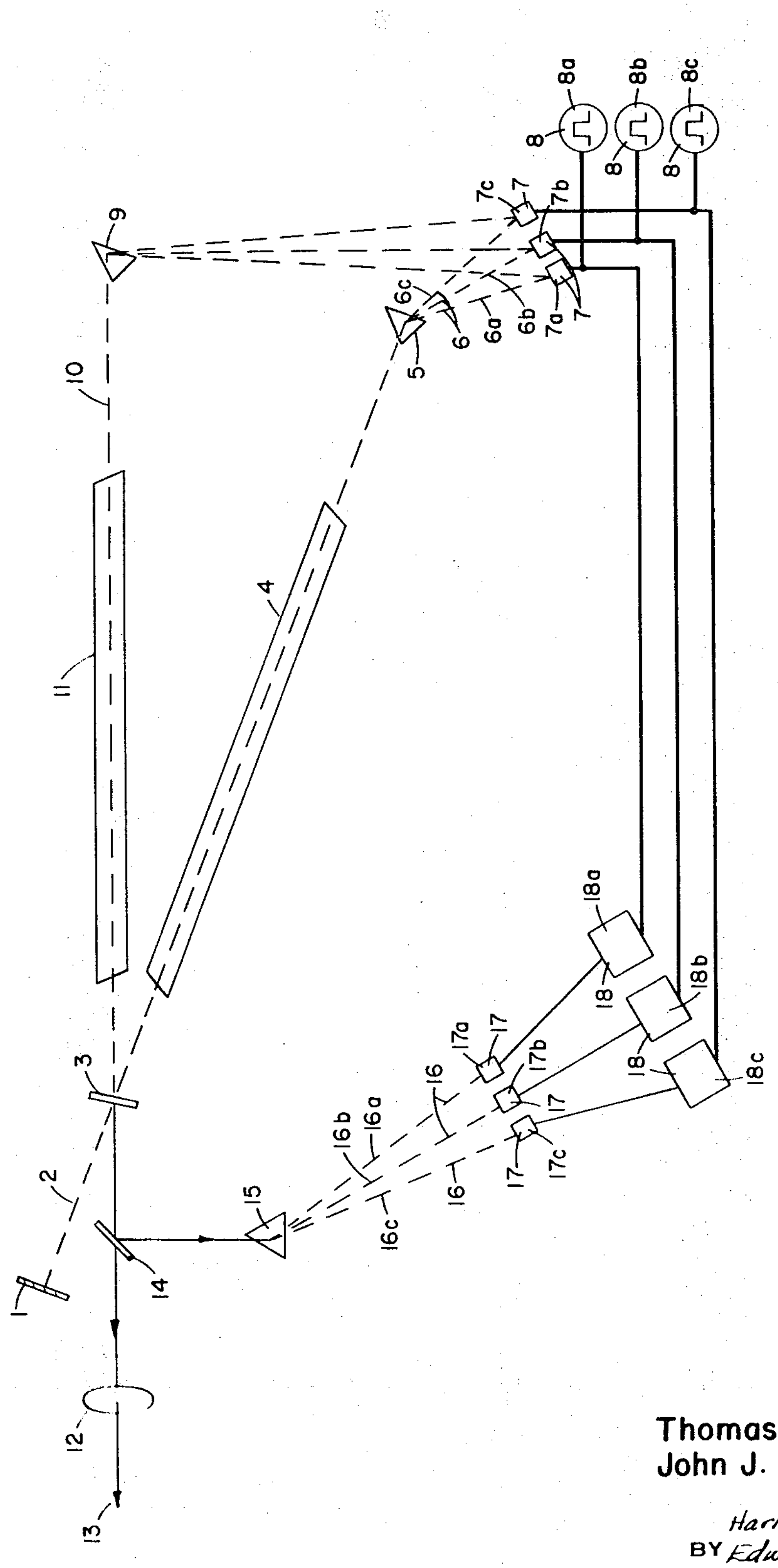
FIG. 1 illustrates in block form the preferred embodiment of the invention.

Referring now to FIG. 1, a mirror 1 reflects any spontaneous or stimulated emission of radiation 2 through a partially transparent, or output, mirror 3 toward a laser amplifier 4. (A gas, liquid or solid laser of sufficient size may be used for the laser amplifiers cited herein; however, the choice will determine the number of frequency components available as well as the ease of aligning the apparatus. A $CO_2$-$N_2$ laser amplifier is preferred for its size and the relatively large number of frequencies for which it is operable).) The radiation 2 is amplified in laser amplifier 4 and passes out of it to a dispersing means 5, which spatially separates the radiation 2 into its frequency components, of which 6a, 6b, and 6c are examples. Dispersing means 5 might be a single Brewster-angle prism, or several such prisms or other devices as might be needed to attain the required dispersion, depending on the frequencies involved. A plurality of the dominant frequency components, for example 6a, 6b, and 6c are intercepted by modulating means 7a, 7b, and 7c, each of which pulse-code modulates the respective frequency component responsive to the respective one of the digital input signals 8a, 8b, and 8c. Mirror 1 regulates counterclockwise operation of the FIG. 1 device. Several types of modulating means may be used as will be discussed later, but for this description the modulating means shown in FIG. 3 will be used.

Figure 3:
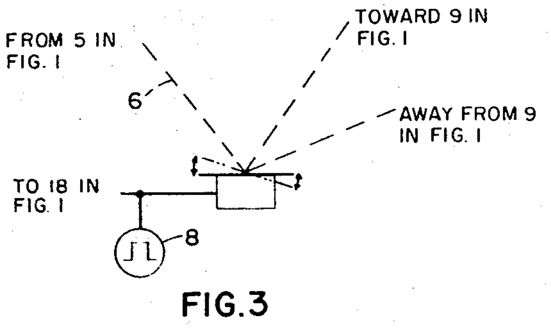
FIGS. 3–5 illustrate in block form three types of modulating means useable in the invention.

Referring now to FIG. 3, a frequency component 6 strikes an adjustable fully reflective mirror 31. A positioning device 32 positions mirror 31 to reflect component 6 either toward or away from a dispersing means 9 (in FIG. 1), respectively according to the binary "on" or "off" condition of signal 8. A suitable positioning device 32, capable of attaining modulation rates in the megahertz range, includes three piezoelectric legs attached to the mirror at points 120° apart on a circle, means for supporting the legs, and means for converting the input signal to voltages applied to the legs to rotate the mirror 31.

Referring again to FIG. 1, dispersing means 9 recombines the frequency components which are reflected toward it by mirror 31 in FIG. 3 into a single beam 10. Beam 10 passes through a laser amplifier 11 for further amplification and onto output mirror 3, which reflects part of beam 10 back through laser amplifier 4, and passes part on through a collimating optics 12 to become output beam 13.

Thus if mirror 31 in FIG. 3 is positioned to reflect the respective frequency component 6 toward dispersing means 9 in FIG. 1, an oscillation is established in the generator at that frequency, and the frequency component will be present in the output beam 13. But if mirror 31 in FIG. 3 is positioned to reflect frequency component 6 away from dispersing means 9 in FIG. 1, that frequency component is lost to the system and will not be present in the output beam 13. Hence each bit of information on a digital input signal 8 in FIG. 1 is represented by the presence or absence of the respective frequency component in the output beam 13 in FIG. 1 at a particular time.

FIG. 1 also shows a stabilization system based on an article by A. D. White in IEEE Journal of Quantum Electronics, Nov. 1965 entitled "Stabilization of Gas Lasers." This system may be necessary if more than a few frequencies are utilized. The particular system shown is suitable for a generator using $CO_2$-$N_2$ laser amplifiers. A beam splitter 14 deflects part of output beam 13 toward a separator, such as dispersing means 15, which spatially separates the frequency components of which 16a, 16b, and 16c correspond respectively to 6a, 6b, and 6c. Sensitive fast-response detectors 17a, 17b, and 17c intercept respectively frequency components 16a, 16b, and 16c, and provide servosystems 18a, 18b, and 18c respectively with electrical signals of amplitudes proportional to the amplitude of the respective frequency components 16a, 16b, and 16c. Servosystems 18a, 18b, and 18c also receive digital input signals 8a, 8b, and 8c respectively. Variable heating of amplifiers 4 and 11 cause irregularities in the gain curves of components 6. Each servosystem 18, compares the electrical signal from the respective fast-response detector 17 with an internally generated sinusoidal reference signal and provides the respective positioning device 32 in FIG. 3 with an error signal to keep the frequency component involved operating at or near the center of its gain curve for alignment of mirror 31 in the "on" position to reflect between dispersing means 5 and 9.

Figure 2:
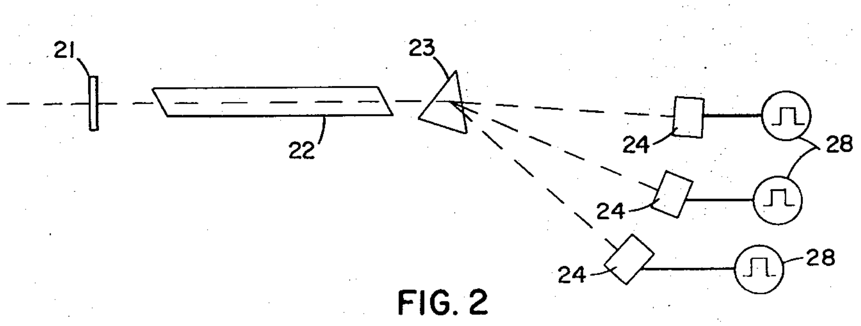
FIG. 2 illustrates in block form another embodiment of the invention.

Another embodiment of the invention is shown in FIG. 2. It includes an output mirror 21, a laser amplifier 22, a dispersing means 23, and a plurality of modulating means 24 responsive to digital input signals 28. Dispersing means 23 combines the functions of the two dispersing means 5 and 9 of FIG. 1; laser amplifier 22 likewise combines the functions of the two laser amplifiers 4 and 11 in FIG. 1; the fully reflective mirror 1 in FIG. 1 is not needed; and no stabilization system is shown.

Otherwise, the operation of the embodiment illustrated in FIG. 2 is the same as that described above for the FIG. 1 embodiment.

Figure 4:
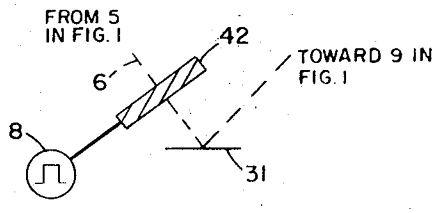
Figure 5:
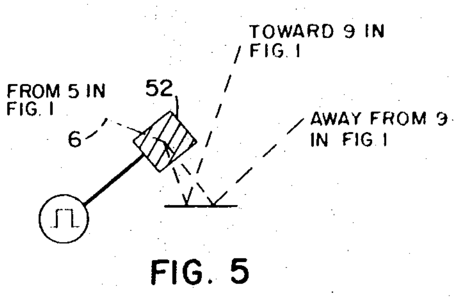

As was mentioned above, modulating means other than that shown in FIG. 3 might be used for accomplishing the pulse-code modulation. Two others are shown in FIGS. 4 and 5, both of which show a fully reflective mirror 31 and a digital input signal 8. Referring to FIG. 4, an absorption modulator 42 either absorbs or lets pass frequency component 6 according to whether signal 8 is in a binary "off" or "on" state respectively. A device utilizing the Franz-Keldysh effect, or one using the electro- or magneto-optic effect in combination with polarizer plates, could be used for absorption modulator 42. Referring to FIG. 5, a refraction modulator 52 changes index of refraction according to signal 8 and causes frequency component 6 either to go into oscillation or to be lost to the system, as shown. A device utilizing the piezoelectric effect to change the refraction index of a crystal or liquid might be used for refraction modulator 52. A modulating means using an absorption or refraction modulator might achieve higher modulation rates than the type shown in FIG. 3, but would reduce the output power of the generator.

Modulating means utilizing two different states of polarization to impress the digital information on the respective frequency component might also be adapted to this invention.

Figure 6:
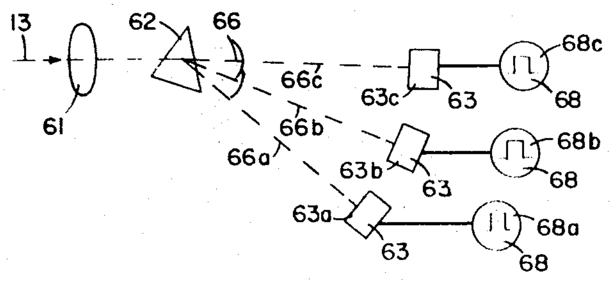
FIG. 6 illustrates in block form a simple receiver for use with the present invention.

FIG. 6 shows a simple receiver which could be used with this invention. Modulated laser beam 13 enters the receiver through a collimating optics 61 and is split by a dispersing means 62 into the frequency components 66*a*, 66*b*, and 66*c* corresponding respectively to 6*a*, 6*b*, and 6*c* in FIG. 1. The frequency components are intercepted by sensitive fast-response detectors 63*a*, 63*b*, and 63*c*, which convert the frequency components into digital signals 68*a*, 68*b*, and 68*c* corresponding respectively to the input signals 8*a*, 8*b*, and 8*c* in FIG. 1. Any differences in the time relations between the digital signals as sent and as received should be negligible, but at any rate can be taken into account by using the effective optical path lengths for the frequency components.

The possible uses of the invention in a digital communication system are many. For example, using N frequency components, in any one bit period one could transmit N binary bits, a single base $2^N$ bit, or a single N-ary bit. Furthermore, any of the frequency component channels could be time-division multiplexed.

The claimed invention is:

1. A laser generator comprising: plural mirrors defining an optical cavity; laser amplifying means disposed within said cavity for generating plural frequency components; at least one dispersing means disposed within said cavity for spatially separating the plural frequency components generated in said cavity; and plural modulating means each disposed for receiving and pulse-coding a respective frequency component to produce a modulated component responsive to a digital signal; said dispersing means and said modulating means being disposed to produce recombination of said frequency components into a single output beam.

2. A laser generator as in claim 1 with: said laser amplifying means including two laser amplifiers disposed at an angle with each having one end near the apex of said angle; said dispersing means being disposed adjacent the respective opposite ends of the amplifiers; said modulating means having mirrors rotatably disposed for reflection of beams between said dispersing means; and a stabilization system including a mirror, a separator, detectors and servosystems having respective generators of sine waves for comparison therewith of the output beams for substantial centralization of the dominant frequency components in their respective gain curves to control orientation of said mirrors between said dispersing means.

3. A laser generator as in claim 1 wherein: said laser amplifying means includes one laser amplifier; said mirrors include an output mirror disposed near one end of said amplifier; and said dispersing means includes one dispersing means disposed near the other end of said amplifier.

4. A laser generator as in claim 1, wherein at least one said modulating means includes an adjustable mirror with a positioning device attached thereto.

5. A laser generator as in claim 1, wherein at least one said modulating means includes a mirror and an absorption modulator.

6. A laser generator as in claim 1, wherein at least one said modulating means includes a mirror and a refraction modulator.

7. A laser generator as in claim 2, wherein at least one said modulating means includes a mirror with a positioning device attached thereto.

* * * * *